United States Patent [19]

Hoppmann et al.

[11] Patent Number: 4,828,100

[45] Date of Patent: May 9, 1989

[54] ROTATING RING ORIENTING FEEDER

[75] Inventors: Kurt H. Hoppmann, Falls Church; James G. Lin, Springfield; Werner H. Schmitt, Falls Church, all of Va.

[73] Assignee: Hoppmann Corporation, Chantilly, Va.

[21] Appl. No.: 836,333

[22] Filed: Mar. 5, 1986

[51] Int. Cl.⁴ .................................... B65G 47/24
[52] U.S. Cl. ............................ 198/392; 198/396; 221/160
[58] Field of Search ........... 198/392, 380, 396; 221/159, 160, 236, 156

[56] References Cited

U.S. PATENT DOCUMENTS

| | | |
|---|---|---|
| 2,744,612 | 5/1956 | Kay et al. . |
| 2,767,881 | 10/1956 | Gruenberg . |
| 2,904,162 | 9/1959 | Simer . |
| 2,928,521 | 4/1960 | Johnson . |
| 3,063,596 | 11/1962 | D'Authevile et al. . |
| 3,329,310 | 7/1967 | Ramsay ........................ 221/236 X |
| 3,392,816 | 7/1968 | Cox ............................... 221/159 X |
| 3,485,338 | 12/1969 | Sterling . |
| 3,531,092 | 9/1970 | Praschak et al. . |
| 3,543,909 | 12/1970 | Ueda . |
| 3,635,325 | 1/1972 | Sterling . |
| 3,658,207 | 4/1972 | Schultz . |
| 3,669,260 | 6/1972 | Hoppmann et al. . |
| 3,684,077 | 8/1972 | Mac Intyre ..................... 198/392 |
| 3,722,674 | 3/1973 | Hoppmann et al. . |
| 3,826,405 | 7/1974 | Hoppmann et al. . |
| 3,831,734 | 8/1974 | Hoppmann et al. . |
| 3,900,107 | 8/1975 | Hoppmann . |
| 3,912,120 | 10/1975 | Hoppmann et al. . |
| 3,960,293 | 6/1976 | Sweet, II et al. . |
| 3,986,636 | 10/1976 | Hoppmann et al. . |
| 4,093,062 | 6/1978 | Sjogren . |
| 4,094,412 | 6/1978 | Hoppmann et al. . |
| 4,098,280 | 7/1978 | Ristvedt et al. . |
| 4,138,009 | 2/1979 | Strong .......................... 221/160 X |
| 4,211,248 | 7/1980 | Lafon . |
| 4,305,496 | 12/1981 | Hoppmann et al. . |
| 4,388,989 | 6/1983 | Edmunds et al. . |
| 4,429,808 | 2/1984 | Doty . |
| 4,462,508 | 7/1984 | Grafius . |
| 4,527,326 | 7/1985 | Kohno et al. . |
| 4,578,001 | 3/1986 | Ochs et al. ..................... 198/392 X |

FOREIGN PATENT DOCUMENTS 2757055 6/1978 Fed. Rep. of Germany .
2507118 12/1982 France .

Primary Examiner—Randolph A. Reese
Assistant Examiner—Peter M. Cuomo
Attorney, Agent, or Firm—Birch, Stewart, Kolasch & Birch

[57] ABSTRACT

A rotating ring orienting feeder including a hopper for containing a supply of articles. A ring is positioned above the hopper. A support member is provided for retaining the ring in a substantially horizontal position. The supports also provide rotation for the ring. A conveyor is provided within the hopper for supplying articles to the ring. A drive mechanism is provided for imparting rotation to the ring and to the conveyor. A plurality of articles are supplied to the ring by the conveyor and are qualified on either side of the ring. Articles not being disposed in a predetermined orientation are returned to the hopper for resupply. In another embodiment, the articles positioned on the ring may also turn from one position into another position in order to qualify the articles directly on the ring.

12 Claims, 8 Drawing Sheets

ROTATING RING ORIENTING FEEDER

BACKGROUND OF THE INVENTION

1. Field of the Invention

The present invention is directed to a rotating ring orienting feeder wherein articles which are not disposed on a rotating ring in a predetermined orientation are returned to a hopper for resupply.

2. Description of Background Art

Conventionally, centrifugal feeders consist of a bowl, a ramp and an elevated rim. Articles are supplied to the bowl by a prefeeder. As the bowl rotates, parts within the bowl are forced outwardly against an upwardly projecting wall of the bowl. A stationary ramp or a rotating ramp convey the articles upwardly onto the elevated rim. Articles disposed on the elevated rim are qualified by means of gates, air jets and/or profile pathways. Articles which are not disposed in a predetermined orientation can only be returned from the inner peripheral surface of the elevated rim back to the bowl.

The performance of a centrifugal feeder is very smooth and fast compared with a conventional vibratory feeder. Articles can be discharged from the centrifugal feeder in a more expeditious manner than from a vibratory feeder. Centrifugal feeders perform best when a high rate of articles are to be delivered from the centrifugal feeder. Centrifugal force is developed by the rotating bowl which propel the articles to the outer peripheral upstanding wall of the rotary bowl. As the bowl rotates faster, a larger number of articles can be discharged from the elevated rim.

Conventional centrifugal feeders require the quantity of articles supplied to the bowl to be limited to a predetermined number. This is necessary in order to optimize the feeding process in view of the fact that limited space is provided for the stationary ramp or rotating ramp for conveying the articles upwardly to the elevated rim. Precise delivery of articles to the bowl is demanded by the prefeeder. This precise delivery is achieved by means of a level sensor in the bowl which indicates when a maximum permissible number of articles are disposed within the bowl.

SUMMARY AND OBJECTS OF THE PRESENT INVENTION

The rotating ring orienting feeder according to the present invention is not a centrifugal feeder. The feeder performs better over an entire range of article delivery from a few articles per minute to a higher rate of articles per minute than is presently capable of being delivered from a centrifugal feeder.

The present invention permits a great deal of economy in construction by unifying the prefeeder and the orienting ring into a single device.

The rotating ring and orienting feeder of the present invention does not require a bowl for feeding the parts to the elevated rim. Thus, overfeeding of the articles to the orienting ring may occur with the surplus articles falling off the ring and returning to the infeed conveyor disposed within the hopper. By overfeeding the orienting ring an optimum number of articles can easily be maintained on the ring without the aid of any orienting mechanism. The conveyor belt disposed within the hopper may be equipped with a motor drive to permit the conveyor belt to be driven at a desirable speed.

The articles conveyed to the orienting ring can be singulated and preoriented by means of gauging and overflow restriction patterns similar to those used in centrifugal feeders. The orienting ring optimizes the number of articles which can be supplied at any desirable speed. Therefore, a smaller orienting ring is equivalent to a larger feeder bowl system, yet requires about half the space of the equivalent prefeeder-centrifugal feeder which is presently required.

These and other objects of the present invention are achieved by providing a rotating ring orienting feeder which includes a hopper for containing a supply of articles. A ring is supported above the hopper for rotation in a substantially horizontal plane. A conveyor is provided within the hopper for supplying articles from the hopper to the ring. Drive means are provided for imparting rotation to the ring and to the conveyor. A plurality of articles are supplied to the ring by the conveyor. The articles are qualified on either side of the ring and articles not being disposed in a predetermined orientation are returned to the hopper for resupply.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

BRIEF DESCRIPTION OF THE PREFERRED EMBODIMENTS

Figure 1:
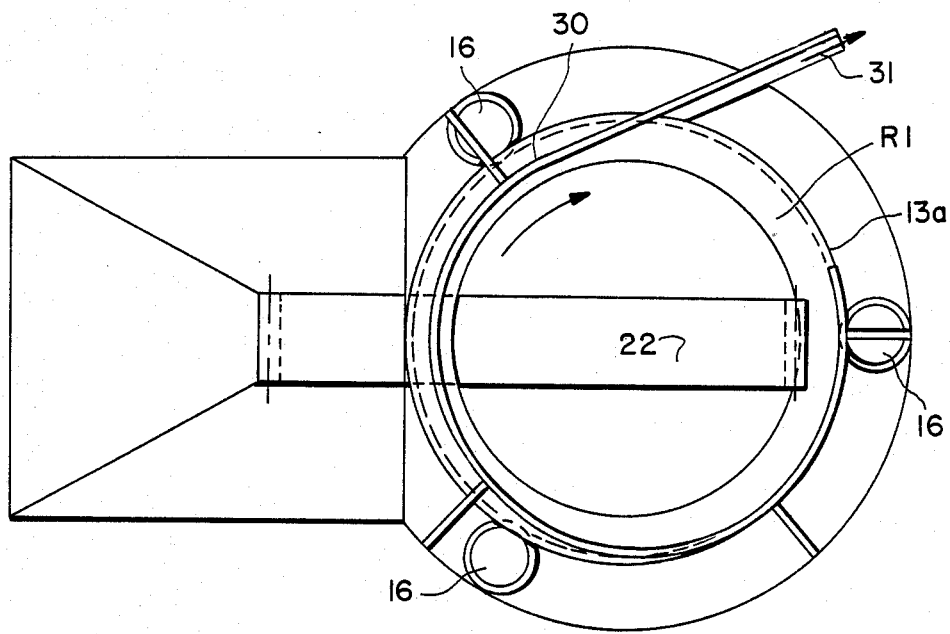
FIG. 1 is a top plan view of the rotating ring orienting feeder according to the present invention.
Figure 2:
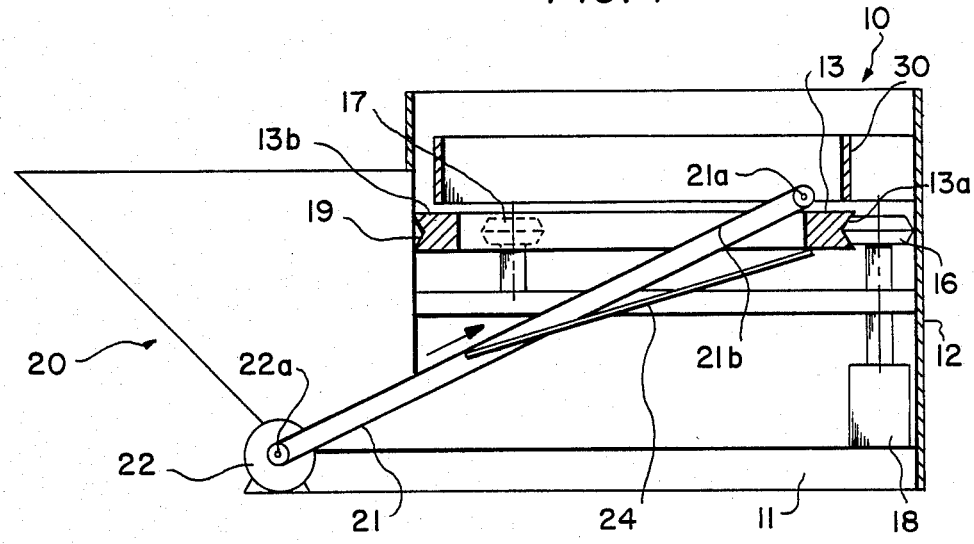
FIG. 2 is a partial cross-sectional view of the rotating ring orienting feeder as illustrated in FIG. 1.

As illustrated in FIGS. 1 and 2, a rotating ring orienting feeder 10 is provided for supplying articles from a hopper 20 to a rotating ring 13. The hopper 20 and a housing 12 are mounted on a base member 11. Supports 16 are affixed to the housing 12 for maintaining the ring 13 in a substantially horizontal position. As illustrated in FIG. 2, the support 16 may be disposed within the inner peripheral surface of the ring 13 as illustrated in dotted lines by support 17.

As illustrated in FIG. 1, three or more supports 16 may be positioned around the outer peripheral edge 13a of the ring 13. One or more of the supports 16 may be connected to a motor 18 for imparting rotation to the ring 13. A V-shaped groove 19 may be positioned on the outer peripheral surface 13a of the ring 13 to ensure stability of the ring 13 relative to the supports 16 and the housing 12.

A conveyor belt 21 is provided with the hopper 20. The conveyor 21 supplies articles upwardly from the hopper 20 to the upper surface 13b of the ring 13. The conveyor belt 21 is operatively connected to a motor 22 for imparting rotation thereto. The motor 22 includes a shaft 22a which may form one end of the endless conveyor belt 21. The other end of the conveyor belt 21 disposed adjacent to the upper surface 13b of the ring 13 may be disposed around a pulley 21a. The pulley 21a is connected to a support 21b for maintaining the distance of the pulley 21a relative to the shaft 22a of the motor 22.

A return plate 24 is mounted beneath the ring 13 for returning articles to the hopper 20. Articles supplied upwardly by means of the conveyor belt 21 are deposited onto the upper surface 13b of the ring 13. Articles which are not disposed in the proper orientation fall off of the ring 13 onto the return plate 24 to be resupplied back to the hopper 20.

An exit ramp 31 is provided for discharging articles from the ring 13. The exit ramp 31 functions together with a wall 30 to singulate the articles as they are discharged from the ring 13. As discussed hereafter the articles discharged from the ring 13 may be disposed in two lines on the upper surface 13b of the ring 13.

Figure 3:
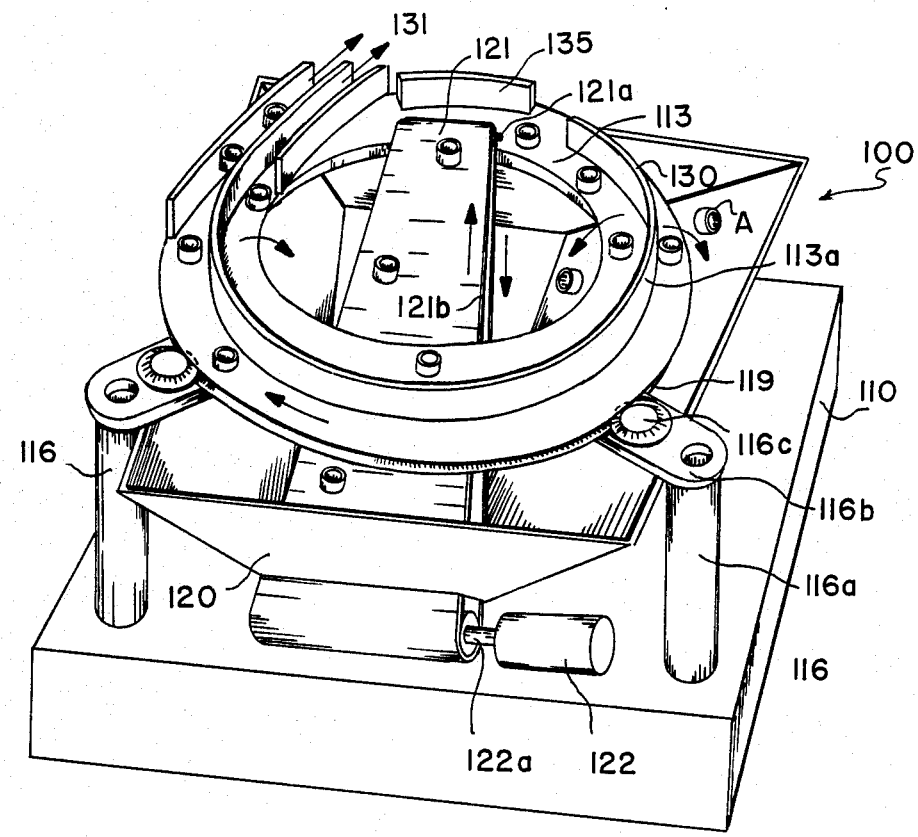
FIG. 3 is a perspective view of another embodiment of the rotating ring orienting feeder according to the present invention.

FIG. 3 is a perspective view of a rotating ring orienting feeder 100. A base 110 is provided for supporting a hopper 120. A ring 113 is mounted on supports 116 in a substantially horizontal position.

The supports 116 include upwardly projecting legs 116a having substantially horizontal arms 116b. The substantially horizontal arms 116b support bearing members 116c which engage an outer peripheral surface 113a of the ring 113. The bearing members 116c may include a V-shaped member for engaging a V-shaped groove 119 in the outer peripheral surface 113a of the ring 113. The hopper 120 is positioned beneath the entire ring 113. In this manner, articles conveyed upwardly by the conveyor 121 are discharged adjacent to the pulley 121a. The articles A are rotated on the upper surface 13b of the ring 13 to the upwardly projecting wall 130. There, the articles are divided into one or more paths. Articles rotated along the wall 130 may be oriented to a predetermined orientation. Articles which are not in the predetermined orientation are returned back to the hopper 120 for resupply by means of the conveyor 121.

As articles are rotated along the wall 130, they are discharged at the exit ramp 131. The articles at the exit ramp 131 are disposed in the proper predetermined orientation in at least two files.

The elevating conveyor 121 is disposed around a pulley 121a positioned at the upper end thereof. A motor 122 is provided with a shaft 122a adjacent to the other end of the conveyor 121. A support 121b is mounted between the shaft 122a and the pulley 121a for accurately positioning the end of the conveyor 121. A wall 135 is mounted on the base 110 adjacent to the conveyor 121. The wall 135 ensures that articles supplied to the ring 113 do not immediately exit from the ring prior to being divided into at least two files.

Figure 4:
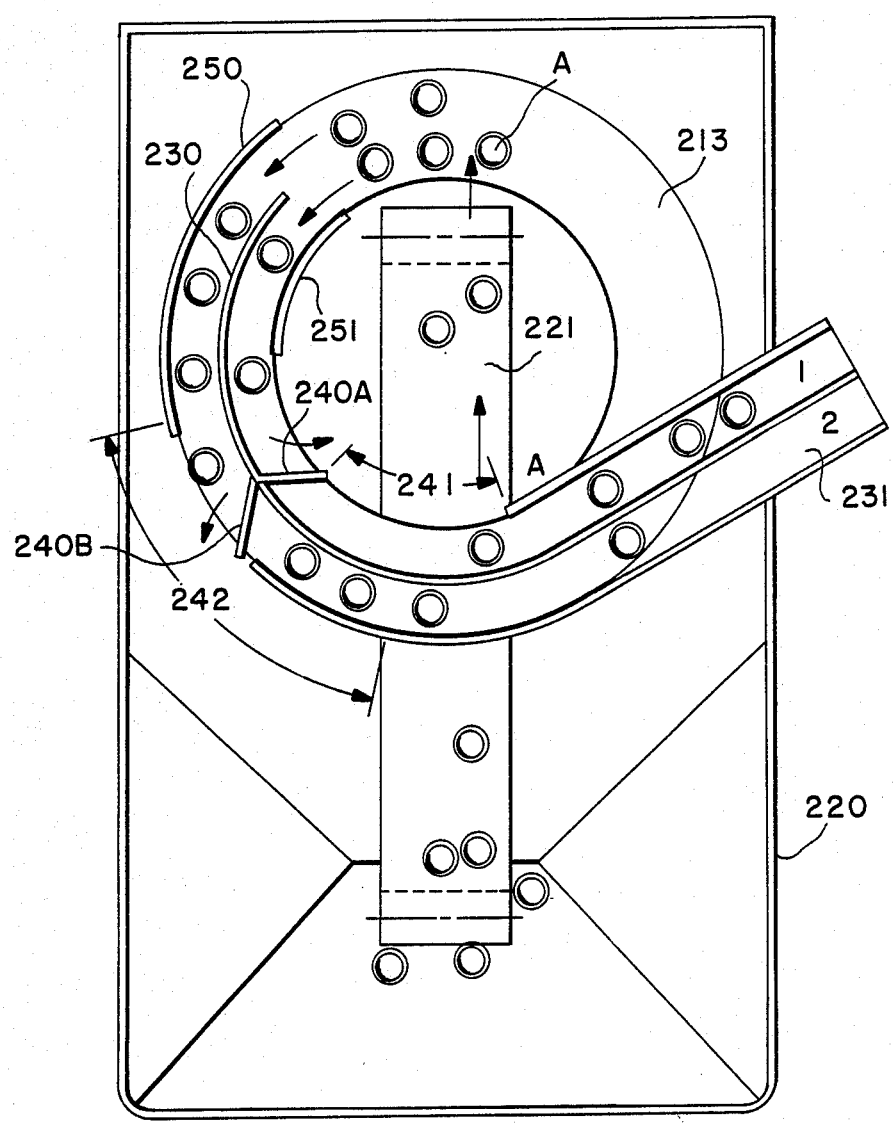
FIG. 4 is a top plan view of another embodiment of the rotating ring orienting feeder according to the present invention.

FIG. 4 is a top plan view of another embodiment of the present invention. A hopper 220 is provided for containing a plurality of articles. A ring 213 is mounted above the hopper 220. A conveyor 221 conveys articles from the hopper 220 upwardly onto the ring 213. The articles A disposed on the ring 213 are rotated past a wall 230. At this point, the articles are divided into one or more files. Qualifiers 240A, 240B are mounted above the two files of articles A. Articles A which are not in a proper orientation are returned to the hopper 220 to be resupplied by means of the conveyor 221. Articles which are in the proper predetermined orientation are rotated towards the exit ramp 231. In this way, at least two files of articles can be delivered from the rotating ring 213 to the exit ramp 231. Articles which are not in the proper predetermined orientation are return to the hopper 220 from either the inside qualifying segment 241 or the outside qualifying segment 242. A wall 250 is provided around a portion of the ring 213 to ensure that the articles arrive at the outside qualification segment 242. Similarly, a wall 251 is provided adjacent to the ring 213 to ensure that the articles arrive at the inside qualification segment 241.

Figure 5:
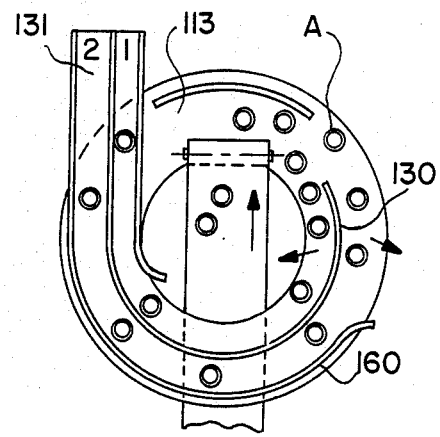
FIG. 5 is a schematic top plan elevation illustrating an orientation of articles wherein the rim is rotating at a slow speed.

FIG. 5 is a schematic view illustrating the rotating ring orienting feeder operating at a slow speed. By rotating the ring 113 at a slow speed, articles A are divided into two paths by the wall 130. Articles A are thereafter discharged at the exit ramp 131. Articles A may be qualified on either the interior portion of the ring 113 or the exterior portion of the ring 113 prior to arriving at a wall 160.

Figure 6:
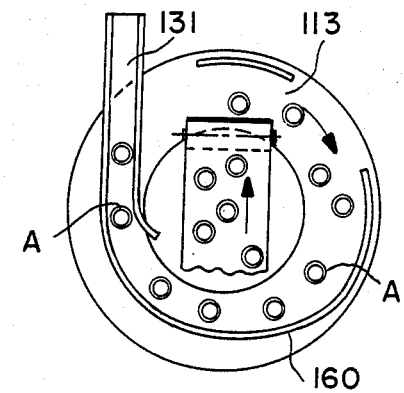
FIG. 6 is a top plan schematic illustration of the rotating rim rotating at a faster speed.

FIG. 6 is a schematic illustration of the rotating ring orienting feeder operating at a faster speed. In this embodiment, the articles A are qualified inwardly of the rotating ring 113. The wall 160 confines the articles to be discharged in a single file at the exit ramp 131.

Figure 7:
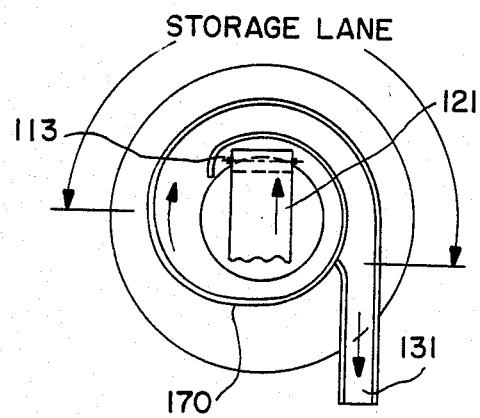
FIG. 7 is a top plan schematic illustration of the rotating rim illustrating a storage capability of the present invention.

FIG. 7 is a schematic illustration of the rotating ring orienting feeder which may function to store articles. The articles are loaded onto the ring 113 by means of the conveyor 121. A wall 170 guides the articles supplied by the conveyor 121 to the ring 113. The articles are qualified to return back to the hopper over the inner peripheral surface of the rotating ring 113. Thereafter, the articles are stored along a substantial path prior to being discharged at the exit ramp 131.

Figure 8:
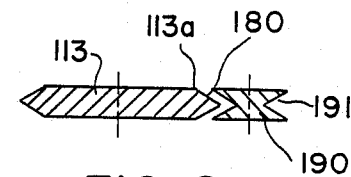
FIG. 8 is a cross-sectional view illustrating an outer support for the rotating rim.

FIGS. 8-12 illustrate a number of various support structures for positioning the ring 113 in a substantially horizontal position. As illustrated in FIG. 8, the ring 113 may include a V-shaped projection at the outer peripheral surface 113A. This V-shaped projection 180 is designed to engage a support 190. The support 190 includes a V-shaped groove 191 disposed therein. In this manner, the positioning of the ring 113 is reliably controlled.

Figure 9:
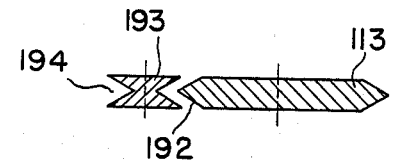
FIG. 9 is a cross-sectional view illustrating an inner support for the rotating rim.

Similarly, as illustrated in FIG. 9, the ring 113 may include a V-shaped projection 192 disposed along the inner surface thereof. The V-shaped projection 192 is designed to mate with a support 193. The support 193 includes a V-shaped groove 194. In this manner, the ring 113 can be accurately positioned to rotate in a substantially horizontal position.

Figure 10:
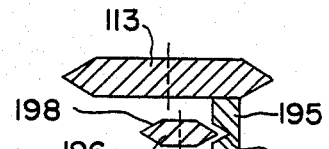
FIG. 10 is a cross-sectional view illustrating a support for the rotating rim being disposed beneath the rotating rim.

As illustrated in FIG. 10, the ring 113 may include a downwardly projecting block 195 disposed adjacent the outer periphery thereof. A support 196 may be positioned adjacent to the downwardly projecting member 195. A V-shaped groove 197 is positioned in the downwardly projecting block 195. Similarly, a V-shaped projection 198 is provided on the support 196. In this manner, the ring 113 may be supported and rotated with all of the moving elements being completely concealed.

Figure 11:
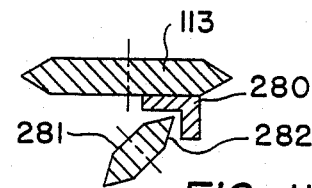
FIG. 11 is a cross-sectional view illustrating a support for the rotating rim being disposed beneath the rotating rim.

Similarly, as illustrated in FIG. 11, the ring 113 may include an L-shaped bracket 280 affixed to the bottom surface thereof. A support 281 may be positioned to engage the L-shaped bracket. The support 281 includes a V-shaped projection 282 which actually meshes with the L-shaped bracket 280. Again, the moving parts for rotating and supporting the ring 113 are concealed.

Figure 12:
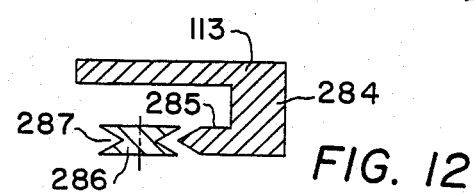
FIG. 12 is a cross-sectional view illustrating a support for the rotating rim being disposed beneath the rotating rim.

FIG. 12 illustrates another embodiment wherein the ring 113 includes an integral downwardly projecting member 284 disposed around the outer peripheral surface thereof. The downwardly projecting member 284 includes a V-shaped projection 285. A support 286 is provided adjacent to the V-shaped projection 285. The support 286 includes a V-shaped groove 287. The V-shaped groove 287 engages the V-shaped projection 285 to support and impart rotation to the ring 113. Again, the moving parts for supporting and rotating the ring 113 are concealed.

Figure 13:
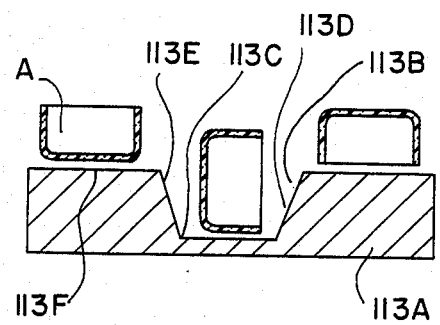
FIG. 13 is a cross-sectional view of a rotating rim illustrating an orientation of an article on the rim.
Figure 14:
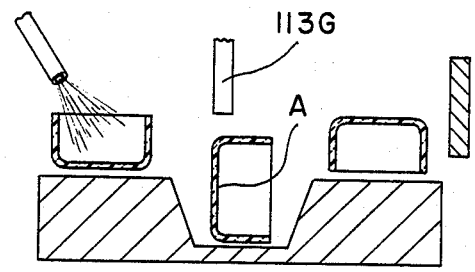
FIG. 14 is a cross-sectional view of a rotating rim orienting of an article on the rim.

FIGS. 13-16 illustrate a few embodiments for the upper surface of the ring 113. As illustrated in FIG. 13, the ring 113A may include a groove 113B. The groove 113B includes a lower surface 113C, an inclined side wall 113D and a second inclined side wall 113E. An article A may initially be positioned adjacent to an inner surface 113F of the ring 113A. By directing a jet of air to the article A, articles which are oriented in the wrong orientation may be moved into the recess 113D.

A wall 113G can ensure that only one article A is moved into the recess 113D at any particular point along the ring 113A. Thereafter, a continued supply of air to the article A will turn the article A to be in the proper orientation as illustrated to the right in FIG. 14.

Figure 15:
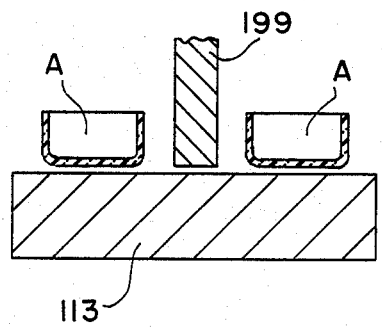
FIG. 15 is a cross-sectional view illustrating a double orientation on the rotating rim.
Figure 16:
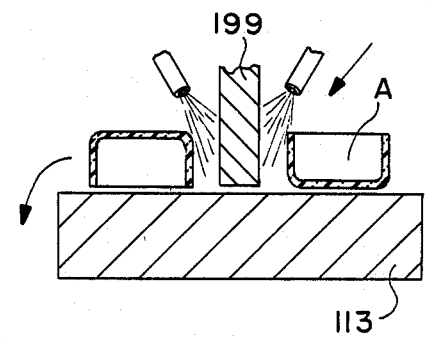
FIG. 16 is a cross-sectional view illustrating a double orientation on the rim.

FIGS. 15 and 16 illustrate an embodiment for providing double orientation on the ring 113. As illustrated in FIG. 15, a wall 199 may be provided to divide articles A into two paths. As illustrated in FIG. 16, articles may be qualified by increasing the width of the wall 199 and supplying a stream of air to the articles A. In this manner, articles which are in the proper orientation would be retained on the ring 113. Articles which are not in the proper orientation will fall from the ring 113 back into the hopper.

Figure 17:
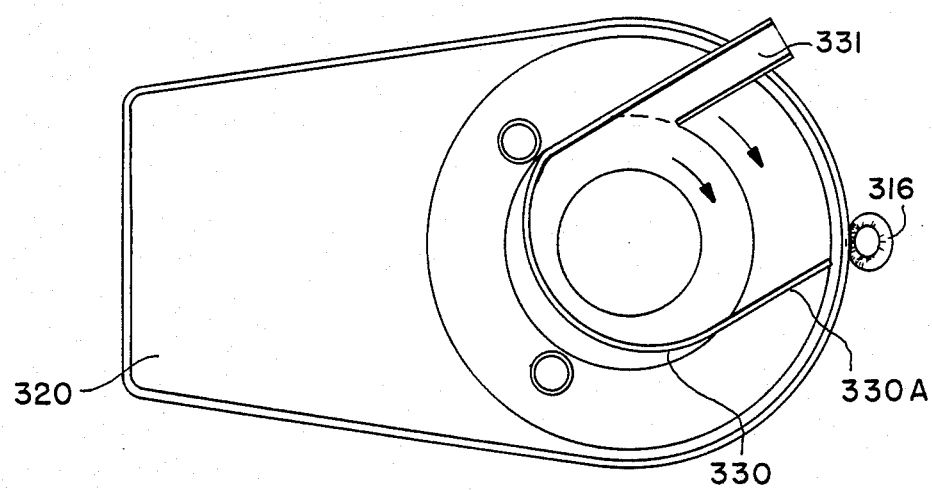
FIG. 17 is a top plan view of another embodiment of the present invention.
Figure 18:
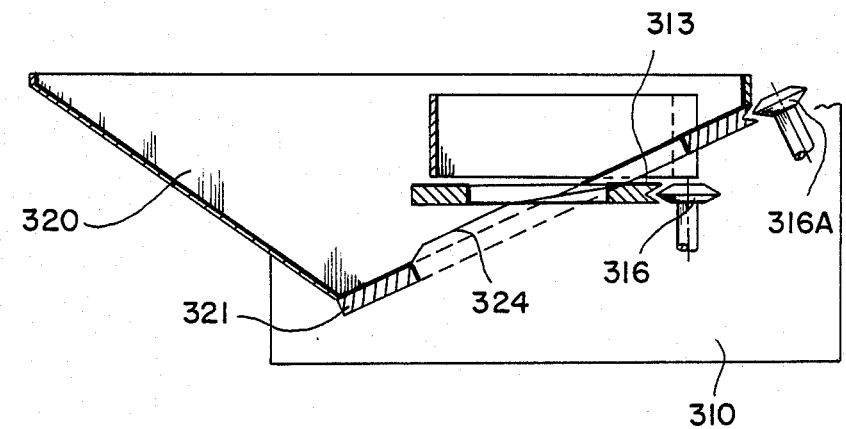
FIG. 18 is a partial cross-sectional view of the rotating ring orienting feeder as illustrated in FIG. 17.
Figure 19:
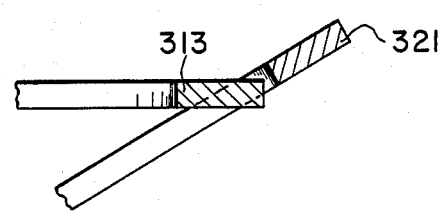
FIG. 19 is a partial cross-sectional view of the disposition of the rotating ring relative to the supply conveyor.

FIGS. 17-19 illustrate a few embodiments for the present invention. A base 310 is provided to form a hopper 320. A ring 313 is mounted in a substantially horizontal position above the hopper 320. A conveyor ring 321 is provided for supplying articles from the hopper 320 to the upper surface of the ring 313. A baffle wall 324 is mounted beneath the ring 313 to direct articles back into the hopper 320 so as to be resupplied by means of the conveying ring 321 upwardly to the ring 313. Support rollers 316 are provided to maintain the ring 313 in a substantially horizontal position. Support rollers 316A are provided adjacent to the conveyor ring 321 for maintaining the position of the conveyor ring 321. As previously discussed, the ring 313 and the conveyor ring 321 may include a V-shaped groove in the outer surface thereof which will mate with a V-shaped projection on the support member 316, 316A. A wiper wall 330A is disposed adjacent to a directing wall 330. Articles conveyed by means of the conveyor ring 321 upwardly onto the ring 313 are moved along the wall 330 to the exit ramp 331.

FIG. 19 illustrates the orientation between the ring 313 and the conveyor ring 321. The conveyor ring 321 is provided at a higher disposition relative to the ring 313. In this manner, articles conveyed upwardly by means of the conveyor ring 321 fall onto the ring 313 and are thereafter qualified.

Figure 20:
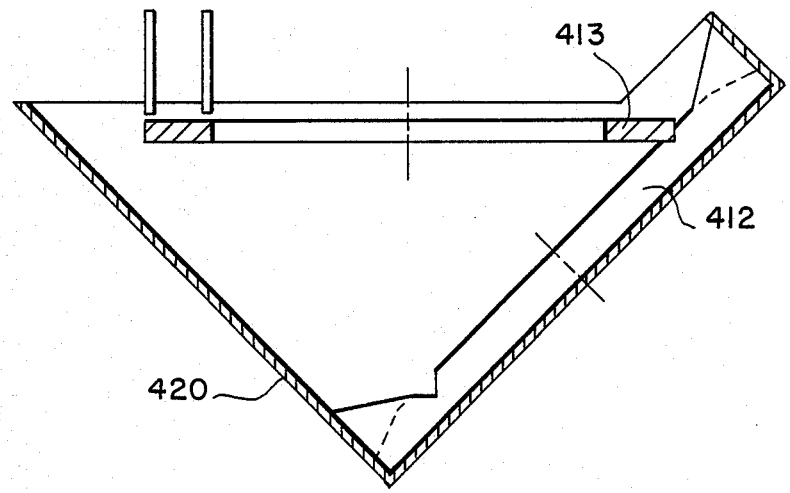
FIG. 20 is a partial cross-sectional view of another embodiment of the rotating ring orienting feeder according to the present invention.
Figure 21:
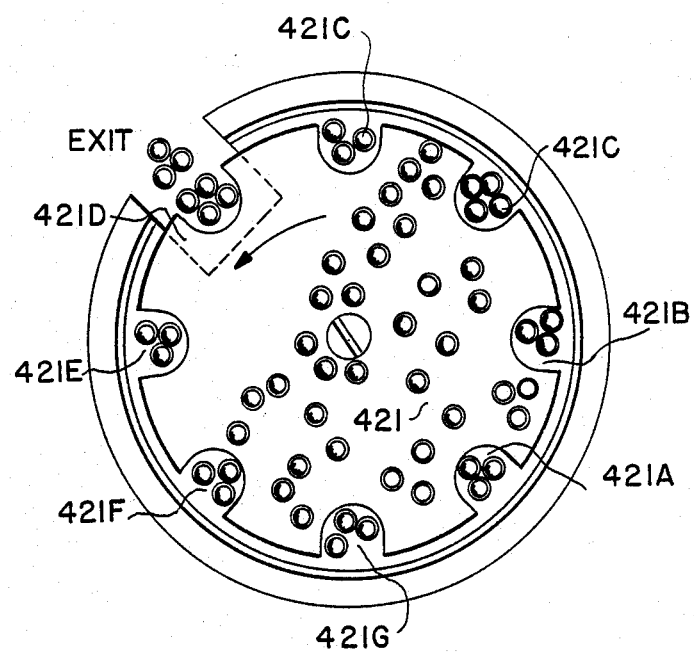
FIG. 21 is a top plan view of a disc pocket feeder utilized in the embodiment illustrated in FIG. 20.
Figure 22:
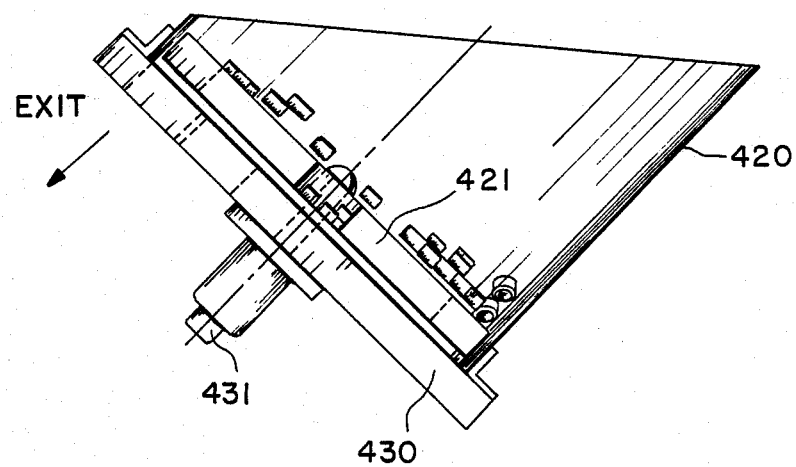
FIG. 22 is a cross-sectional view illustrating a support and backup plate of the disc with pockets utilized in combination with the rotating ring orienting feeder illustrated in FIG. 20.

FIGS. 20-22 illustrate another embodiment of the present invention. In this embodiment a disc 421 is provided for conveying articles within a hopper 420 upwardly onto a ring 413. As illustrated in FIG. 21, the disc 421 includes a plurality of pockets 421A-421G. Articles disposed within the hopper 420 fall into one of the pockets 421A-421G. Thereafter, the articles move upwardly to fall onto the upper surface of the ring 413. The articles are rotated around th ring 413 and thereafter are discharged from the device after being qualified. Articles which are not in the proper predetermined orientation are returned to the hopper 420 for resupply by means of the disc 421.

As illustrated in FIG. 22, the disc 421 may be disposed on a backup plate 430. The backup plate 430 is disposed as one wall of the hopper 420. A shaft 431 projects through the backup plate 430 for imparting rotation to the disc 421. A motor may be connected to the shaft 431 so as to convey articles from the hopper 420 upwardly to the ring 413.

The present invention illustrates two motors for imparting rotation to either the ring or the conveyor. It is anticipated that a single motor may be utilized to impart drive to both the ring and the conveyor. A suitable gearing arrangement would be provided to ensure that the ring and the conveyor are operated at the proper speed.

The conveyor illustrated in FIGS. 1-4 may include a plurality of bars disposed across the width thereof. In this manner, articles positioned within the hopper are engaged by the bars and are held on the conveyor as they are moved upwardly to be discharged onto the top surface of the ring. Any other suitable means of retaining the articles on the conveyor during their journey upwardly may be incorporated into the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:
1. A rotating ring orienting feeder comprising:
    a hopper for containing a supply of articles;
    a ring having a predetermined width including an outer peripheral surface and an inner peripheral surface with an open central portion positioned directly above a portion of said hopper;
    support means for supporting said ring for rotation directly above a portion of said hopper in a substantially horizontal position;
    conveying means mounted within said hopper below said ring and projecting upwardly through said open central portion in said ring to a point above said ring for supplying articles from said hopper to said ring, said conveying means in an endless conveyor mounted as a lower wall of said hopper for continuously supplying articles disposed within said hopper to said ring;
    drive means for imparting rotation to said ring and to said conveying means;
    wherein a plurality of articles are supplied to said ring by said conveying means and are qualified on at least one of said outer peripheral surface and said inner peripheral surface of said ring, articles not being disposed in a predetermined orientation are directly returned to said hopper and said endless conveyor positioned below said ring for resupply.
2. A rotating ring orienting feeder according to claim 1, wherein said support means includes rollers mounted to engage said outer peripheral surface for supporting and guiding the ring.
3. A rotating ring orienting feeder according to claim 2, wherein said support means includes at least three rollers and said drive means is operatively connected to at least one roller for imparting rotation to said ring.
4. A rotating ring orienting feeder according to claim 1, wherein said support means includes rollers mounted to engage said inner peripheral surface for supporting and guiding the ring.
5. A rotating ring orienting feeder according to claim 4, wherein said support means includes three rollers and said drive means is operatively connected to at least one roller for imparting rotation to said ring.
6. A rotating ring orienting feeder according to claim 1, wherein said drive means includes a first drive motor operatively connected to said support means for rotating said ring and a second drive motor operatively connected to said conveying means for imparting rotation to said conveying means.
7. A rotating ring orienting feeder according to claim 1, and further including a wall disposed adjacent to an upper surface of said ring for dividing articles disposed on said ring into two files.
8. A rotating ring orienting feeder according to claim 7, and further including an exit ramp, articles divided on said ring are qualified on either side of said ring and thereafter exit from said rotating ring orienting feeder on said exit ramp.
9. A rotating ring orienting feeder according to claim 1, wherein said ring includes an upper surface with a depression for qualifying articles on said ring.
10. A rotating ring orientating feeder comprising:
    a hopper for containing a supply of articles;
    a ring positioned above said hopper, said ring includes a block extending downwardly from a lower surface of said ring and said support means includes rollers mounted to engage an inner peripheral surface of said block for supporting and guiding the ring;
    support means for supporting said ring for rotation above said hopper in a substantially horizontal position;
    conveying means mounted within said hopper for supplying articles from said hopper to said ring;
    drive means for imparting rotation to said ring and to said conveying means;
    wherein a plurality of articles are supplied to said ring by said conveying means and are qualified on either side of said ring, articles not being disposed in a predetermined orientation being returned to said hopper for resupply.
11. A rotating ring orienting feeder according to claim 10, wherein said support means includes three rollers and said drive means is operatively connected to at least one roller for imparting rotation to said ring.
12. A method of orienting articles on a rotating ring comprising the following steps:
    supplying articles into a hopper;
    conveying articles by means of an endless conveyor from said hopper to a ring having a predetermined width including an outer peripheral surface and an inner peripheral surface with an open central portion and being rotatably supported directly above a portion of said hopper;
    qualifying articles on either side of said ring wherein the articles are qualified on at least one of said outer peripheral surface and said inner peripheral surface of said ring and articles which are not disposed in a predetermined orientation are directly returned to said hopper and said endless conveyor positioned below said ring for resupply, said endless conveyor being mounted as a lower wall of said hopper;
    discharging articles disposed in the predetermined orientation from said ring.

* * * * *